United States Patent [19]
Kim et al.

[11] Patent Number: 5,245,496
[45] Date of Patent: Sep. 14, 1993

[54] SELF-PROGRAMMING NON-INVASIVE MOTOR OVERLOAD PREVENTION SYSTEM

[76] Inventors: Nam H. Kim, 600 Warren Rd., Apt. 1-2C; Sang K. Yon, 109 N. Cayuga St., Apt. D, both of Ithaca, N.Y. 14850

[21] Appl. No.: 745,792

[22] Filed: Aug. 16, 1991

[51] Int. Cl.$^5$ .............................................. H02H 3/08
[52] U.S. Cl. ........................................ 361/30; 361/93
[58] Field of Search ............... 361/30, 24, 25, 28, 361/29, 93, 94, 45; 324/244, 247, 260, 249; 315/129

[56] References Cited

U.S. PATENT DOCUMENTS

| | | | |
|---|---|---|---|
| 4,631,625 | 12/1980 | Alexander et al. | 361/94 |
| 4,851,775 | 7/1989 | Kim et al. | 324/247 |
| 4,958,252 | 9/1990 | Murphy | 361/93 |
| 4,963,818 | 10/1990 | Obama et al. | 324/249 |
| 5,012,168 | 4/1991 | Dara et al. | 361/24 |
| 5,041,761 | 8/1991 | Wright et al. | 315/129 |

Primary Examiner—A. D. Pellinen
Assistant Examiner—S. Jackson
Attorney, Agent, or Firm—Salzman & Levy

[57] ABSTRACT

The present invention features a system and method for determining an overload condition in either DC or AC motors. The system of the invention is non-invasive, in that the impedance of or the current in the line is not affected by the system measurement of the line current being drawn by the motor. A pair of current sensing toroids having variable permeability is placed about the lead-wire(s) of the motor, without interrupting the current path in the line. The sensors each consists of metallic glass that changes its permeability as a function of an external magnetic field. Current in the lead-wire(s) creates a magnetic field. The inductance of the sensors varies in direct proportion to the magnetic field. A controller starts the motor. As the motor starts, the pattern of load current drawn by the motor is measured and stored in memory. The sensors are connected to an oscillator circuit, whose output frequency is proportional to the current drawn by the motor load. The output of the oscillator circuit is connected to a microprocessor controller for determining the current profile of the electric motor being monitored and controlled.

11 Claims, 6 Drawing Sheets

SELF-PROGRAMMING NON-INVASIVE MOTOR OVERLOAD PREVENTION SYSTEM

FIELD OF THE INVENTION

This invention relates to a non-invasive system for measuring the current drawn by an electric motor and, more particularly, to a non-invasive system for measuring current drawn by DC or AC electric motors and for protecting the motors from damaging overload currents.

BACKGROUND OF THE INVENTION

The present invention is for a system utilizing a microprocessor-controlled current sensor, which functions in the capacity of a fuse or circuit-breaker for an electric motor.

There are essentially two advantages in which the inventive system is an improvement over similar "state of the art" motor protection systems: (a) in the ability of the invention to "learn" a start-up load-current profile for the particular motor being monitored, therefore not having to manually search for an appropriate tripping point, and (b) in the ability of the invention to monitor a motor load-current "non-invasively." In essence, the present invention customizes itself or adapts to each motor being monitored.

The invention monitors the current drawn by the electric motor by placing two sensors about the line or lines through which current is provided to the electric motor. Although this type of non-invasive mechanism is not new per se for detecting current, it is believed, however, that it has never been used in this type of peak current protecting application, or for the purpose of protecting electric motors, either AC or DC.

The method of non-invasive testing of motor currents in accordance with the invention, as aforementioned involves the placement of two magnetic-field sensitive current sensing elements adjacent or about the lead-wires of the motor. The sensing elements are positioned about the lead wires, one for each direction of current. As the current flowing through each line increases in one direction, the inductance of the current sensing elements for that direction decreases. A circuit connected to the current sensing elements measures and transforms the inductance into a square wave, whose frequency is inversely proportional to the magnitude of the inductance. The number of pulses in a given time period is counted, yielding a number proportional to frequency. The circuit of the system contains a microprocessor controller, which calculates the amount of current in the motor lines by applying a formula stored in memory to the measured frequency.

DISCUSSION OF RELATED ART

Similar current protection systems of the prior art use either a shunt resistor or a transformer coil in the motor current lines to detect the current drawn by the motor. A shunt resistor has the drawback of introducing extra resistance in the line. This produces extra heat, and changes the input-impedance. Moreover, it becomes impractical for such a current measurement system to be used with currents greater than 30 amperes. A system using a shunting scheme in the form of a tripping plug to measure and guard against overload currents is shown in U.S. Pat. No. 4,958,252, issued to Murphy on Sep. 18, 1990, entitled: Circuit Breaker with Rating Plug Having Memory.

A typical system using the transformer method is illustrated in U.S. Pat. No. 4,631,625, issued to Alexander et al on Dec. 23, 1986, entitled: Microprocessor Controlled Circuit Breaker Trip Unit. A transformer measurement generally relies on the emf produced from flux-change. This measurement is useful only for a sinusoidal current, as is the case described in the Alexander et al reference. Even these sinusoidal currents must be sampled at a reasonably high frequency to provide accurate and meaningful results. Such measurement systems are, therefore, not available for DC motors having non-sinusoidal line currents.

By contrast with these prior art systems, the present invention provides a magnetic-field sensitive method that reproduces an exact current profile at any frequency of current including substantially constant DC current.

The current sensors of the invention employ magnetic-field sensitive inductor-sensors to measure current. While these particular sensors are known for their use as current sensors in a general sense, their use for protection of motors, or as a general circuit-breaker, is deemed to be novel.

Another innovative aspect of the inventive system is its ability to learn and respond to deviations from a normal, but changing load-current.

Prior current-sensing motor control systems ignore the initial, high load-current drawn by a motor. The invention, by contrast however, can "learn" the pattern of the start-up load-current. This is accomplished by sensing the pattern during one initial start-up of the motor, and storing this information in memory.

The inventive system can also monitor and record the steady-state motor current. This "learned" information is then used as a characteristic pattern in determining future overload conditions occurring in subsequent motor operation. This is especially useful in situations where a motor is frequently being turned on and off. Such "cycle-on-demand" situations are prevalent, for example, in an assembly line, where the start-up period contributes a substantial part of the total running time of the motor.

In most conventional current-sensing systems, the trip point for breaking a current drawing line is manually and/or arbitrarily set. Therefore, the current at which the system trips the motor drive may not be a critical value indicative of a dangerous condition or overload. The user does not know, a priori, where to set the peak current for breaking the circuit. The user usually determines the critical value from an iterative search process which, hopefully, yields an operating point that is not undervalued to cause repeated and unnecessary circuit trippings, or overvalued so that damage from overload conditions occurs before the circuit is successfully broken.

Compared with the prior art, the method of the invention automatically determines the appropriate tripping criteria during an initial learning cycle. The inventive method uses a series of mathematical calculations to generate a digital representation of the current profile.

The slope of the load-current vs. time curve, as well as its absolute magnitude upon motor start-up, provides a profile for accurately setting the load-breaking point.

This is particularly significant, because ordinarily the magnitude of the acceptable load-current can change greatly due to certain extraneous conditions affecting the motor, such as motor temperature due to oil viscosity in the gear box and resistance of the armature coil.

By learning and monitoring a motor current profile, the invention can detect a sudden change in the load upon the motor and is therefore more sensitive to load changes than are prior art systems.

The invention, in order to avoid the prior art inaccuracies and imprecision, uses both the absolute maximum magnitude of the current and the maximum-slope of the load-current vs. time curve to determine if the motor controller should be tripped.

SUMMARY OF THE INVENTION

In accordance with the present invention, there is provided a system and method for determining an overload condition in either DC or AC motors. The system of the invention is non-invasive, in that the impedance of or the current in the line is not affected by the system measurement of the line current being drawn by the motor. A pair of current sensing toroids having variable permeability is placed about the lead-wire(s) of the motor, without interrupting the current path in the line. The sensors each consists of metallic glass that changes its permeability as a function of an external magnetic field. Current in the lead-wire(s) creates a magnetic field. The inductance of the sensors varies in direct proportion to the magnetic field. A controller starts the motor. As the motor starts, the pattern of load current drawn by the motor is measured and stored in memory. The sensors are connected to an oscillator circuit, whose output frequency is proportional to the current drawn by the motor load. The output of the oscillator circuit is connected to a microprocessor controller for determining the current profile of the electric motor being monitored and controlled.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the system of this invention features a system and method for determining an overload condition in either DC or AC motors. The system of the invention is non-invasive, in that the impedance of or the current in the line is not affected by the system measurement of the line current being drawn by the motor. The system has the ability to learn the unique pattern of motor operation, and to develop therefrom an operating profile. The operating profile is then utilized to prevent current overload conditions from affecting or otherwise damaging the motor.

Figure 1:
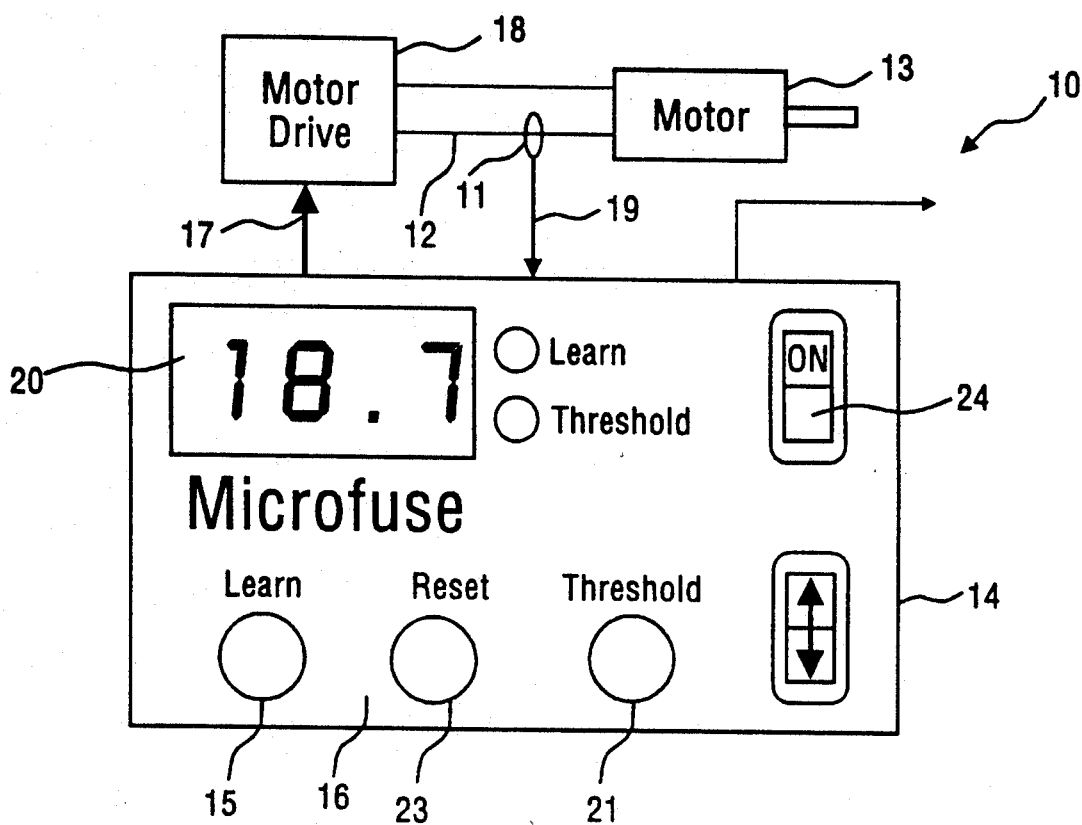
FIG. 1 is a schematic view of the control apparatus for monitoring the current drawn by an electric motor, and preventing an overload condition from causing damage thereto, in accordance with the system of this invention.

Now referring to FIG. 1, the current monitoring and overload prevention apparatus and system 10 of this invention is shown. The apparatus and system 10 features a sensor 11 that, in the preferred embodiment, is placed around the lead-wire or line 12 feeding current to a typical motor 13, which may be either an AC or a DC motor. It should be understood, however, that the preferred embodiment is used with DC or single phase AC motors, but alternate embodiments can easily be fabricated to incorporate a plurality of sensors, each for a separate phase used in poly-phase AC motors. The sensor 11 does not interrupt the current path feeding the motor 13. The sensor 11 is connected to a control apparatus 14 via line 19, and feeds the control apparatus 14 a signal to suspend motor operation 13 when an overcurrent condition is detached. A user of the apparatus and system 10 sets the control apparatus 14 to the "learn" mode of operation by pushing button 15, marked "learn" on panel 16. The motor 13 is then started. The control apparatus 14 will then "record" the pattern of load-current drawn by the motor 13, as the motor starts-up and reaches its normal rotational speed. After a predetermined time interval, the control apparatus 14 completes the learning cycle and automatically goes into the monitoring mode. The control apparatus 14 then starts to display the load current being drawn by motor 13 on display 20. At any time thereafter, the user may set the operating threshold for motor 13 by pressing the threshold button 21. The "threshold" is defined as: the percentage of maximum-current and maximum rate of current change (the maximum slop of the current vs. time curve) that the control apparatus 14 has determined for motor 13 during the learning phase.

If, at any time during monitoring, the control apparatus 14 via sensor 11 detects a current or a rate of change of current that exceeds the threshold (i.e., a current magnitude above the maximum threshold current or a current having a rate of change greater than the maximum of the threshold rate of change of current), it provides a signal along line 17 to the motor drive 18 to suspend motor operation.

Figure 2:
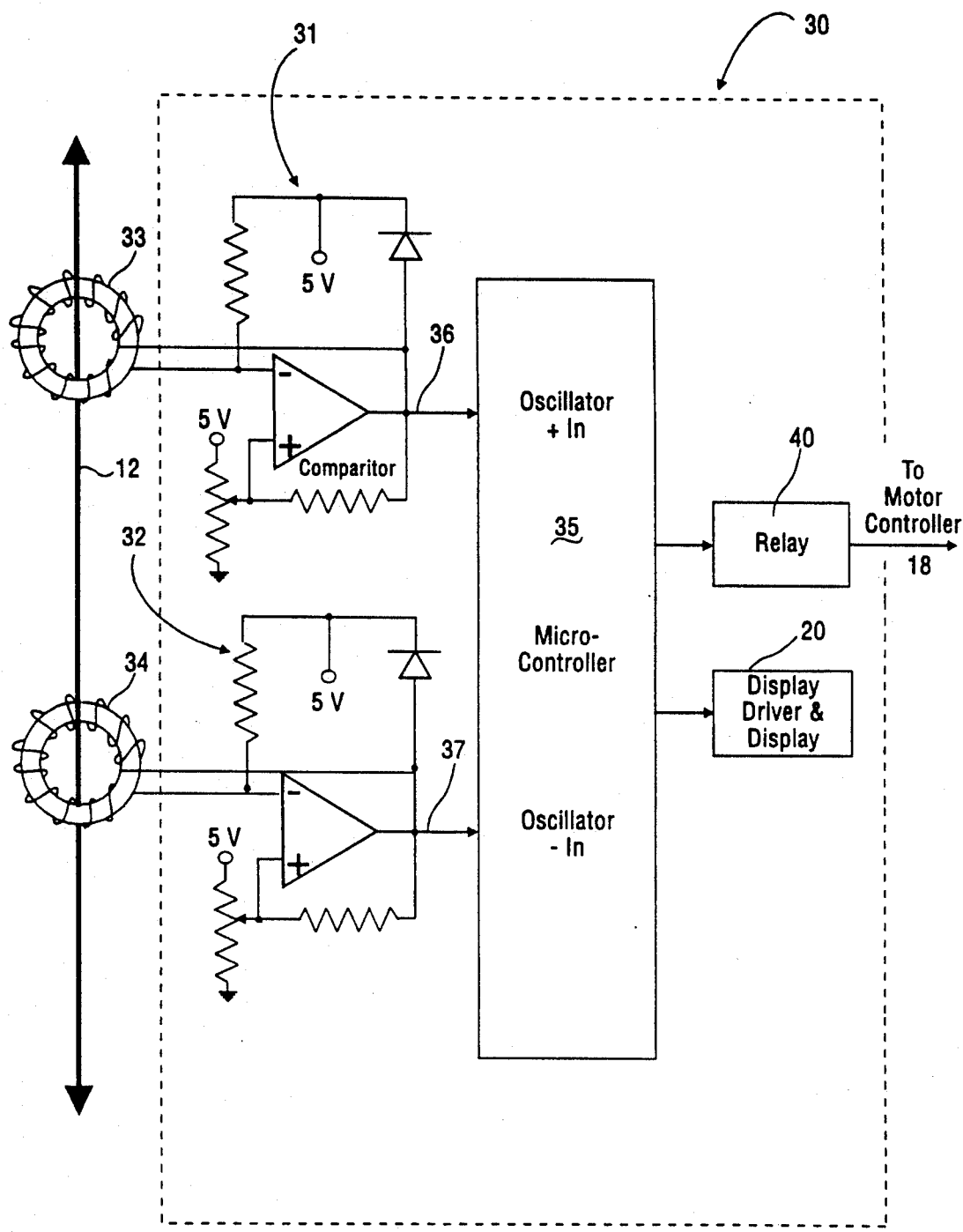
FIG. 2 is a circuit of the control apparatus of FIG. 1, utilized for sensing and monitoring the currents drawn by the electric motor.

Now referring to FIG. 2, a circuit 30 is shown which is part of the control apparatus 14 illustrated in FIG. 1. The current sensor 11 of FIG. 1 consists of two toroid-oscillator circuit units 31 and 32, respectively, each of which monitors load-current flowing in one direction of line 12. The only physical difference between these two toroid-oscillator circuit units 31 and 32 is that the toroid 33 of toroid-oscillator circuit unit 31, is wound in an opposite sense to the toroid 34 of toroid-oscillator circuit unit 32. The sensing material inside the toroids 33 and 34 is amorphous metallic glass which changes its magnetic permeability when an external magnetic field is applied. It has been found that metallic glass sensors are significantly more sensitive i detecting magnetic fields than are Hall effect sensors.

The lead-wire 12 carrying load-current from the motor drive 18 (FIG. 1) to the motor 13 is made to pass through the centers of both toroids 33 and 34, respectively. The current flowing in line 12 produces a magnetic field in a circumferential direction, whose magnitude is directly proportional to that of the current. The magnetic field thus created, in turn causes a change in permeability of the metallic glass, and hence, in the inductance of the toroids 33 and 34, respectively. Letting L+ be the inductance of the toroid which senses current in the positive direction (I+); and letting L− be the inductance of the toroid which senses current in the negative direction (I−), the following relations will apply:

$$L+ = \frac{a}{(1 + b \cdot I+)} \quad (1)$$

$$L- = \frac{a}{(1 + b \cdot I-)} \quad (2)$$

where "a" and "b" are constants, when the sensing elements 33 and 34 are used int heir substantially linear range.

The toroid-oscillator circuit units 31 and 32, respectively, each comprises a relaxation oscillator, whose output is a square-wave. The frequency of the square-wave generated by each relaxation oscillator of toroid-oscillator circuit units 31 and 32, respectively, is inversely proportional to the inductance varying in their respective toroids 33 and 34. The frequency si given by:

$$f+ = c \cdot (1 + b \cdot I+); \quad (3)$$

$$f- = c \cdot (1 + b \cdot I-). \quad (4)$$

where "b" and "c" are constants.

The outputs of these two oscillators are then fed into a microcontroller 35, via respective lines 36 and 37. Microcontroller 35 in the preferred embodiment is a Model No. M68HC11A8 microprocessor-based controller manufactured by the Motorola Corp. The determination of these frequencies is described hereinafter.

From these frequencies, direction and magnitude of load-current for motor 13 (FIG. 1) is determined. A internal timing function is used to provide an integration or sampling period for the load current. It is important to match the integration period with the natural period of the output of motor drive 18. The usual frequency is 120 Hz, and 120 Hz is the frequency of choice for a rectified DC motor-drive.

When an overload is detected by microcontroller 35, as described hereinafter, it will cause a normally open switch (not shown) of relay 40 to close and a normally closed switch of relay 40 (not shown) to open. The relay 40 is connected to stop port of a particular motor drive 18 in such a way that this change in state of the relay will stop the motor operation.

The routine or program for operating the circuit and control apparatus of FIGS. 1 and 2 is described with reference to FIGS. 3 through 5. The operations being described should be interpreted with reference to the graph illustrated in FIG. 6, which typifies current drawn by a DC motor under control vs. time. During the description of the monitoring of the current for this motor, references to the IN-RUSH period and VALLEYS in the current vs. time curve of the motor will be made.

Figure 3:
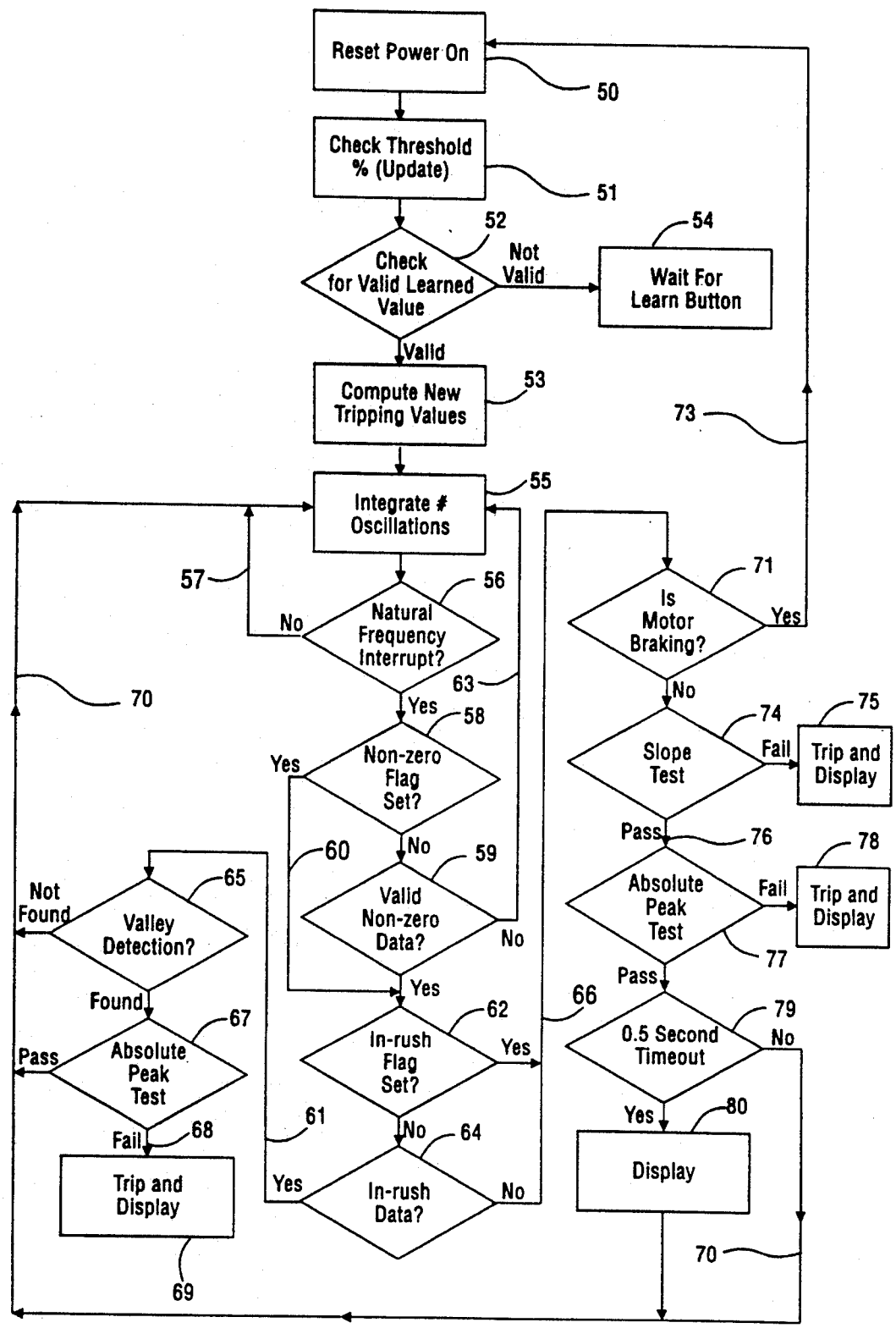
FIG. 3 is a flow chart of the method utilized by the microcontroller of the control apparatus and circuit of FIGS. 1 and 2, respectively, obtaining current values for tripping or otherwise stopping motor operation.

Now referring to FIG. 3, a flow chart for the operation of the microcontroller 35 of circuit 30 is depicted. The operation of the microcontroller 35 describes how the data obtained from the toroid-oscillator circuit units 31 and 32 respectively, is processed. At the heart of the method is an incrementing procedure that integrates the number of oscillations that occur during a "natural period", which equals approximately 8.33 milliseconds at a national frequency of 120 Hz for the application of a rectified DC motor-drive. This integrated number is used as a sample to represent the current during the given natural period.

Electrical sources (motor drive 18) feeding current to the motor 13 always have periodic outputs. In a 60 Hz AC line it is 60 Hz sinusoidal current. Even in a DC motor drive, the current is not truly a constant value. It is actually a 120 Hz rectified signal. Therefore, if the signal is integrated over a period other than natural period (approximately 8.33 ms in the case of a rectified DC signal), then such an integration causes an undesired and artificial oscillation in the integrated current-samples. Such an oscillation undermines the slope determination method, which is one of two methods used by the invention to detect an overload.

The "Learn," "Reset," and "Threshold" buttons 15, 23, and 21, respectively, that are shown upon the control panel 16 of control apparatus 14 (FIG. 1), each induce interrupts in the flow chart methodology, and are each discussed hereinafter.

The power of the control apparatus 14 (FIG. 1) is turned on via switch 24, step 50 (FIG. 3). This initializes the operation of the apparatus. Initialization may also be accomplished by the Reset button 23.

All the flags that signal different conditions to the different stages of the operation of the apparatus are cleared by this initialization. Then, a check of the memory (not shown) of the microcontroller 35 of apparatus 14 is made, step 51 for the "threshold" value (in terms of %). This value is initialized to 0% if a meaningless value is detected. Meaningless values can occur if a power failure erases the memory of the microcontroller. When a valid value is detected, the threshold value is left unchanged and the decision step 52 is exited to step 53. If a meaningless value is detected for the set of values that characterizes the previously learned motor operation, a message prompting the user to program the apparatus 14 is displayed in window display 20. The Learn button 15 is then pressed, as indicated by step 54. If a valid set of values (non-zero current) is detected, then a new set of "tripping" values is computed (step 53) using the learned values and the threshold percentages.

Then the system integrates the number of oscillations per natural period, step 55. This is accomplished by incrementing a counter (not shown) each time a rising edge of the square wave from inductor-oscillator circuit units 31 or 32 is detected. An internally triggered interrupt occurs at the end of the natural period, step 56. If this integrated value does not represent valid non-zero data, it implies that motor operation has not yet been initiated. Hence, a counter (not shown) is cleared and integration is re-initiated, step 55, via line 57, for a new current sample. If the integrated value represents a non-zero value, step (58), step 62 is entered via line 60. Valid, non-zero data, (step 59), sets the non-zero flag, and also allows entry to step 62. If non-valid data is detected, (step 59), reintegration of the number of oscillations is required, step 55, via line 63.

A test is made to see if the present data is in the in-rush period of the motor operation, step 62. This test is done by summing the absolute values of the difference $(X_i - X_{i-1})$ over a given number of previous samples, where $X_i$ represents the present sample. For the particular application being considered herein, this number of previous samples, also referred to as the window size, is 10. If the summed value is less than a specified value, the system recognizes that the current has stabilized, and the in-rush period has ended. Hence, another flag, the in-rush flag is set, step 62, so that this test need not be repeated.

If the summed value is greater than the specified value, step 64, the data is considered in-rush data and the system looks for a valley, step 65 in the in-rush period, reached via line 61. If the present data occurs prior to the detection of a valley, the counter (not shown) is cleared and integration, step 55, is re-initiated via line 70. If the present data occurs after the detection of the valley, it is tested against a learned and computed absolute peak, step 67, referred to herein as the "tripping" absolute peak. If the present data exceeds the "tripping" absolute peak, microcontroller 35 signals the motor drive 18 to suspend motor operation line 68 and converts the present data into current and displays the value in amperes on display 20, step 69.

If the present data is less than the "tripping" absolute peak, step 67, then the counter (not shown) is cleared and the integration process, step 55, is re-initiated via line 70.

If the data is not in-rush data, it is tested, line 66, to see if the motor is stopped externally, step 71. This external stopping of the motor 13 can occur by means of a limit-switch (not shown) or manual shut-off of power. If this condition is detected, the counter (not shown) is cleared and the process is returned to the "Reset" state, step 50, via line 73. If motor-stopping is not detected, then the rate of change of the current is calculated by summing $$S_i = \sum_{j=i-n}^{i} (X_j - X_{j-m})$$

where "n" is the window size, and "m" is the optimal differential interval for this operation (decision step 74).

For the present application, n=5 and m=5. If this sum exceeds the "tripping" rate of change computed at the beginning of the running mode, microcontroller 35 signals the motor drive 18 to suspend motor operation, converts the present data into current, and displays it in terms of amperes, step 75 on the panel display 20. If the sum does not exceed the "tripping" rate of change, then step 74 is exited via line 76, and a second test is performed.

If the present data exceeds the "tripping" absolute peak value, step 77, microcontroller 35 signals the motor controller 18 to suspend motor operation, converts the data into current, and displays it in terms of amperes on the panel display 20, step 78. If the data passes both tripping tests steps 74 and 77, the routine checks for a 0.5 second timeout, step 79, and displays on the panel display 20 the average current over the last 0.5 seconds before the timeout occurred, step 80. This enables the average current displayed on display 20 to be updated once every 0.5 seconds. If no timeout occurs, step 79 is exited via line 70, and the integration, step 55, is re-entered.

Figure 4:
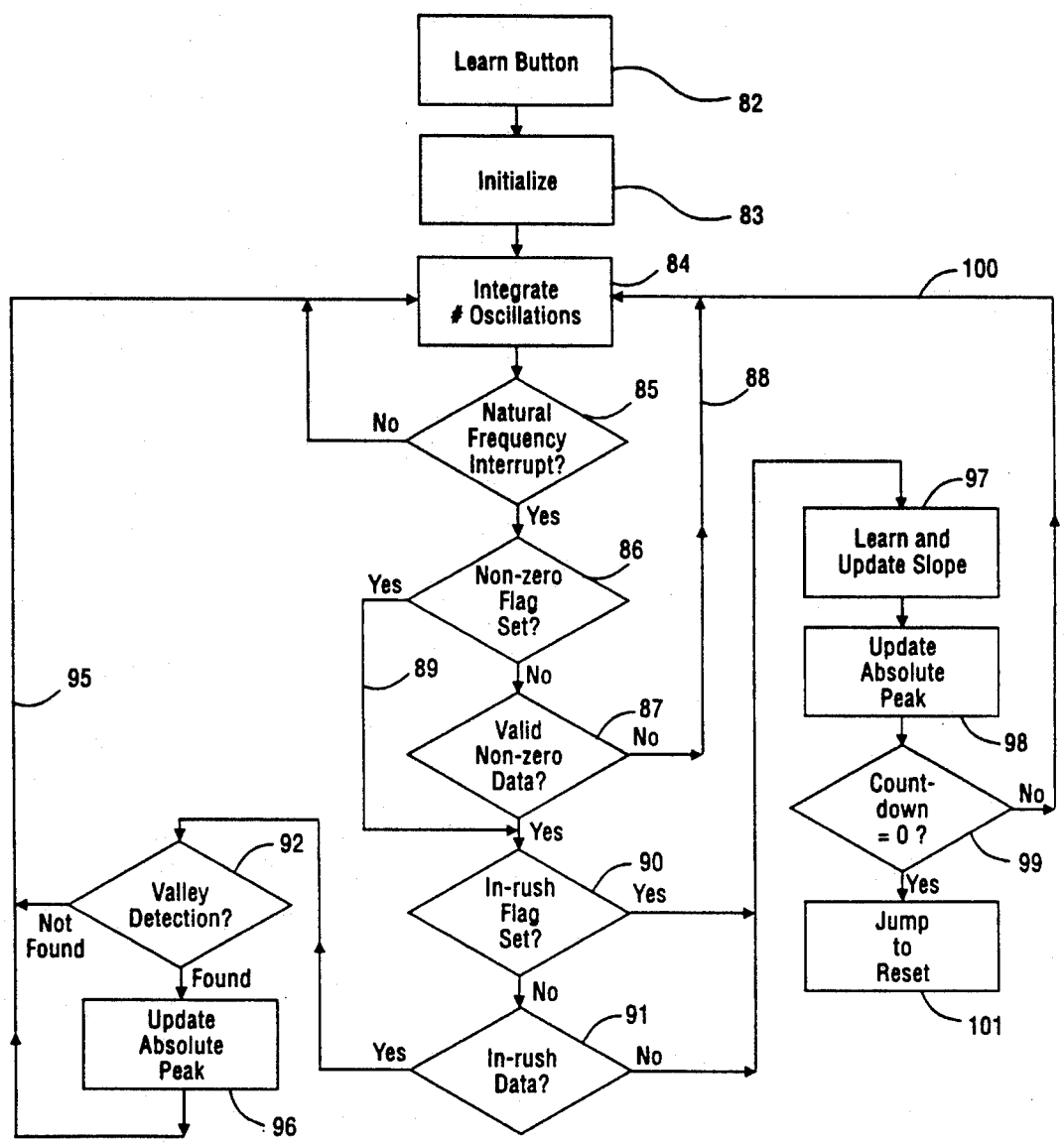
FIG. 4 is a flow chart of the method utilized by the control apparatus and circuit of FIGS. 1 and 2, respectively, for operating the system of this invention in the learning mode.

Referring to FIG. 4, a flow chart depicting the operation of the system in the learning mode is illustrated. This process takes place after the "Learn" button 15 (FIG. 1) on panel 16 of the control apparatus 14 has been pressed, step 82. The routine initializes all its variables, step 83, clears all the flags, and forgets the characteristics of any previous motor operation. Then it initiates the natural frequency integration, step 84, as described in the routine of FIG. 3. Then a check for the first valid non-zero data is made via steps 85, 86 and 87.

If non-zero data is not detected, the integration is re-initiated via line 88. If non-zero data is detected, the non-zero data detected flag is set via line 89, so that this test need not be repeated. Then the present data is tested to see if it is data in the in-rush period of the motor operation, steps 90 and 91, in the identical manner as described for the routine of FIG. 3. If the data is in the in-rush period, valley detection is performed, step 92. If this data is prior to the valley detection in the in-rush period, a new integration is initiated, step 84, via line 95. If the data is after the valley detection in the in-rush period, it is used to update the absolute peak current value, step 96. In other words, if the present data is greater than the previous absolute peak, the present data becomes the new absolute peak value. Thereafter, the integration is re-initiated, step 84.

If the present data is not in-rush data, then the in-rush flag is set so that this test need not be repeated, step 90, and a timeout mechanism is started. Then the sum $S_i$ is computed in an identical manner to that previously described. If the sum so computed is greater than the present maximum slope value, the maximum slope value is replaced by said sum, step 97. The present data is then used to update the absolute peak value as was done in the in-rush period previously described, step 98. If the timeout mechanism previously started has not run out, step 99, the counter is cleared and integration is re-initiated, step 84, via line 100. If the timeout takes place, the routine of this program automatically resets itself, step 101, to the "Reset" state, step 50.

Figure 5:
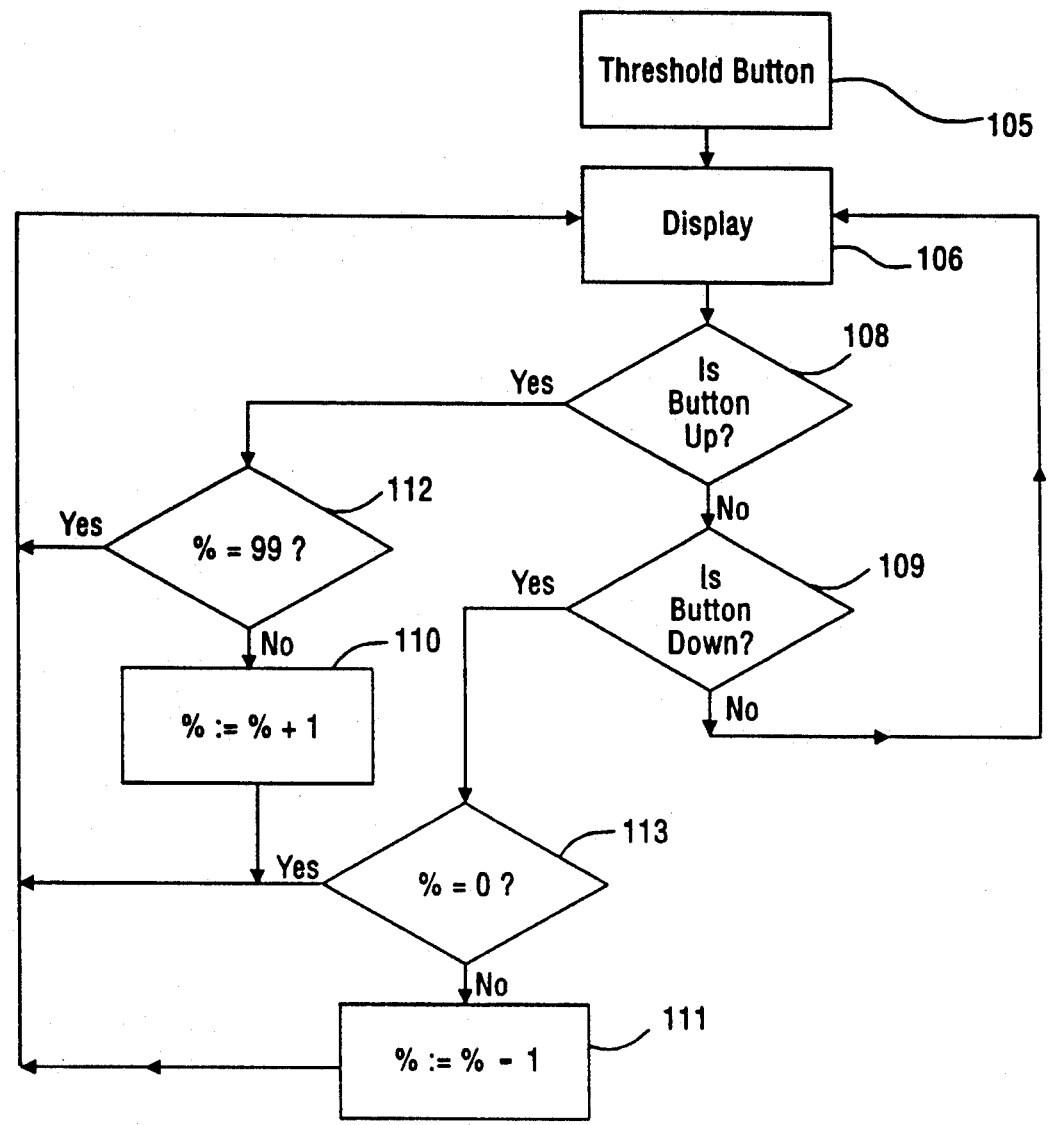
FIG. 5 is a flow chart of the method utilized by the control apparatus and circuit of FIGS. 1 and 2, respectively, for operating the system of this invention in the threshold updating mode.
Figure 6:
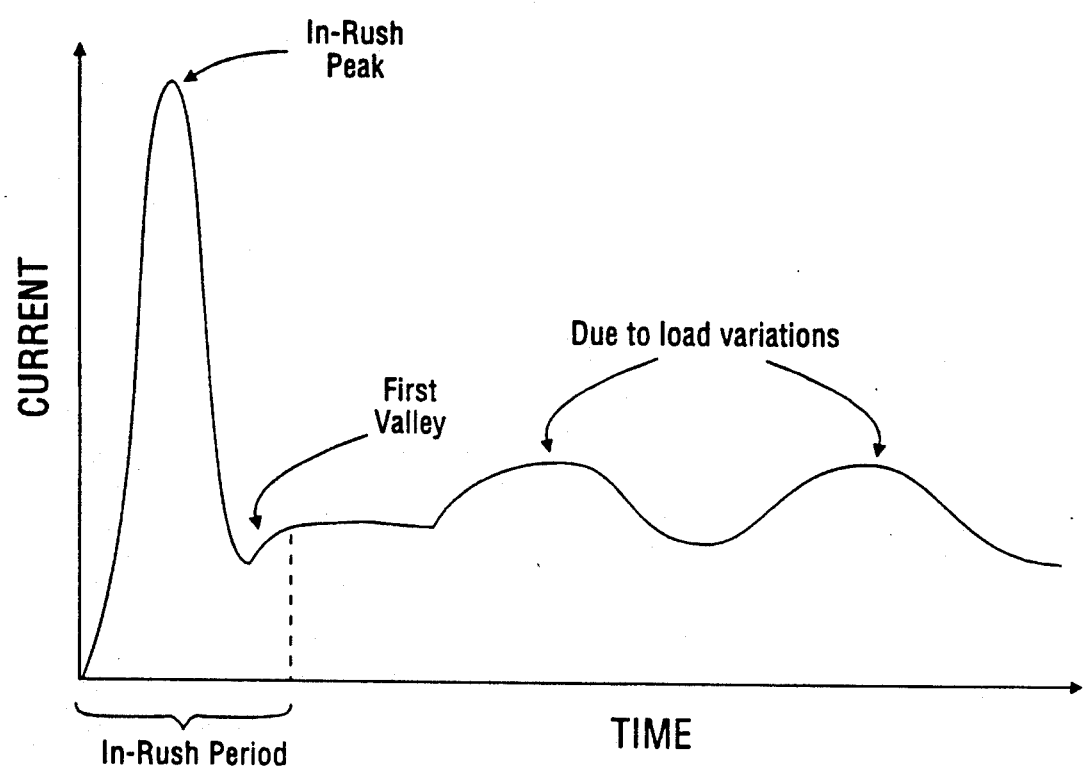
FIG. 6 is a graph of current versus time, depicting the current drawn by a typical DC electric motor.

The flow chart of FIG. 5 depicts the threshold updating mode of operation for the control apparatus 14 (FIG. 1). This process is initiated by pressing the Threshold button 21 on control panel 16, step 105. The present threshold value, in terms of percentage above the learned value, is displayed on screen 20, step 106. The process then waits for either the "up" or the "down" button, steps 108 and 109, respectively to be depressed. If an "up" is detected then the percentage value is incremented by one, step 110), and then the new percentage is displayed on screen 20. If a "down" is detected, step 109, the percentage value is decremented by one, step 111, and then the new percentage is displayed on screen 20. The new values must fall between 0 and 99, steps 112 and 113, respectively, or the change will not be implemented. Only the "Reset" button 23, or a power failure, will cause the routine to jump out of this process.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method of non-invasively monitoring and protecting an electric motor from overload currents, comprising the steps of:

a) sensing current in a line feeding current to an electric motor as a function of an increasing or decreasing magnetic field generated by motor current, and in response to said sensed motor current, generating a signal indicative of said motor current;

b) generating an output signal in response to said generated signal of said sensing means, said output signal being representative of the sensed motor current;

c) receiving said output signal and in response thereto generating characteristic data specific to said electric motor; and thereafter d) utilizing said characteristic data for protecting said electric motor from subsequent current overload conditions; and e) displaying said motor current.

2. The method of claim 1, wherein said step (c) for generating said characteristic data, further includes the step of:

i) distinguishing an in-rush period of motor operation from a stead-state period of said motor operation.

3. The method of claim 1, wherein said step (c) for generating said characteristic data further includes the step of:

i) generating data representative of maximum or "absolute peak" motor current values.

4. The method of claim 3, wherein said step (c) of generating said characteristic data further includes the steps of:

ii) updating said data representative of maximum or "absolute peak" motor current values; and iii) storing said updated data representative of motor current vehicles.

5. The method of claim 1, wherein said step (c) for generating characteristic data further includes the step of:

i) determining a maximum slope value of said motor current.

6. The method of claim 5, wherein said step (c) for generating characteristic data further includes the step of:

ii) updating said maximum slope value of said motor current; and iii) storing said updated maximum slope value.

7. The method of claim 1 wherein steps (a)–(d) are repeated in a monitoring mode and step (c) further comprises:

i) comparing instantaneous data representative of motor current values with previously learned absolute peak motor current values.

8. The method of claim 1 wherein steps (a)–(d) are repeated in a monitoring mode and step (c) further comprises:

i) comparing instantaneous data representative of slope of said motor current with previously learned maximum slope value of said motor current.

9. A method of non-invasively monitoring and protecting an electric motor from overload currents, comprising the steps of:

a) operating in a learned mode, comprising the steps of:

a1) sensing current in a line feeding current to an electric motor as a function of an increasing or decreasing magnetic field generated by motor current, and in response to said sensed motor current, generating a signal indicative of said motor current;

a2) generating an output signal in response to said generated signal of said sensing means, said output signal being representative of the sensed motor current;

a3) receiving said output signal and in response thereto generating characteristic data specific to said electric motor, said characteristic data comprising:

a4) generating data representative of maximum or "absolute peak" motor current values;

a5) determining a maximum slope value of said motor current;

a6) distinguishing an in-rush period of motor operation from a steady-state period of said motor operation; and b) operating in a monitoring mode, comprising the steps of:

b1) repeating steps (a1)–(a3);

b2) comparing instantaneous data representative of motor current values with previously learned absolute peak motor current values;

b3) comparing instantaneous data representative of slope of said motor current with previously learned maximum slope value of said motor current.

10. A control system for monitoring and protecting an electric motor from overload conditions by learning from past motor data, comprising:

a) sensing means operatively connected to a line connected to an electric motor under test for sensing load conditions of said electric motor and in response to said sensed load conditions generating a signal indicative of said load conditions; and b) a processor for operating in a learning mode; said processor operatively connected to said sensing means and including generating means for receiving said signal and in response thereto generating characteristic data specific to said electric motor, said characteristic data comprising:

i) data representative of maximum or "absolute peak" motor load values; and ii) a maximum slope value of said motor load values;

said processor utilizing said characteristic data to distinguish an in-rush period of motor operation from a steady-state period of said motor operation, said processor operating in a monitoring mode, and thereafter comparing instantaneous data representative of motor load values with previously learned absolute peak motor load values, and then comparing instantaneous data representative of the slope of said motor load with a previously learned maximum slope value of said motor load.

11. A self-learning control system for monitoring electric motor overload conditions, comprising:

sensing means for sensing load conditions in a line feeding current to an electric motor and generating an output signal which is proportional to the sensed load conditions; and control means connected to said sensing means for receiving said output signal of said sensing means, and in response thereto, generating characteristic slope values of load specific to said electric motor, said control means thereafter utilizing said characteristic slope values for protecting said electric motor from subsequent overload conditions, said control means further including means for determining said characteristic load values by distinguishing an in-rush period of motor operation from a steady-state period of said motor operation.

* * * * *